United States Patent [19] [11] 4,151,258
Crnojevich et al. [45] Apr. 24, 1979

[54] DISSOLUTION OF COBALTIC HYDROXIDE WITH ORGANIC REDUCTANT

[75] Inventors: Ranko Crnojevich, Gretna; Edward I. Wiewiorowski; Donald H. Wilkinson, both of New Orleans, all of La.

[73] Assignee: Amax Inc., Greenwich, Conn.

[21] Appl. No.: 883,377

[22] Filed: Mar. 6, 1978

[51] Int. Cl.² ............................................. C01G 51/10
[52] U.S. Cl. ................................................... 423/150
[58] Field of Search ........................ 423/140, 150, 592

[56] References Cited

U.S. PATENT DOCUMENTS 2,726,144   12/1955   Wallis et al. ......................... 423/592

OTHER PUBLICATIONS

Young, R. (Editor), Cobalt, Reinhold Publishing Corp., N.Y., 1960, pp. 307, 308.

*Primary Examiner*—Brian Hearn
*Attorney, Agent, or Firm*—Michael A. Ciomek; Eugene J. Kalil

[57] ABSTRACT

A method is provided for effecting the dissolution of a cobaltic hydroxide-containing precipitate which may also contain nickel, wherein an aqueous slurry of the precipitate containing trivalent metal is acidified to a pH of from about 0.1 to 2, and the aqueous slurry then treated with an organic reductant to effect substantial reduction of the trivalent metal to the divalent state and hence the dissolution of said precipitate.

13 Claims, No Drawings

DISSOLUTION OF COBALTIC HYDROXIDE WITH ORGANIC REDUCTANT

This invention relates to the acid dissolution of cobaltic hydroxide-containing precipitates by reduction of trivalent metal in said precipitate to the divalent state.

BACKGROUND OF THE INVENTION

It is known to produce cobaltic hydroxide-containing precipitates as a by-product in the hydrometallurgical treatment of nickel-bearing materials, such as oxidic nickel ores or nickel sulfide concentrates or mattes. Nickel and cobalt are usually found together in natural-occurring minerals and, because conventional ore dressing methods do not effect a separation of these two elements, both metals generally appear together in solutions resulting from the leaching of nickel and cobalt-containing materials, such as in the leaching of nickeliferous oxide ores or the oxidation leaching of nickel sulfide concentrates or mattes.

In recent years, several hydrometallurgical methods have been proposed for the recovery of nickel and cobalt from lateritic ores or from nickel and nickel-copper mattes. With regard to the former, reference is made to U.S. Pat. Nos. 3,933,975, No. 3,933,976 and No. 4,034,059, among others. As regards the leaching of nickel and nickel-copper concentrates or mattes, reference is made to U.S. Pat. Nos. 3,293,037, No. 3,741,752 and No. 3,962,051.

The nickel leach solution obtained from the foregoing nickeliferous materials usually contains cobalt which is generally removed in order to provide a high purity nickel solution, for example, a solution having a nickel-to-cobalt ratio of over 1000:1. One method for removing the cobalt from solution as a cobaltic hydroxide precipitate is disclosed in U.S. Pat. No. 3,933,976.

The ratio of Ni/Co in the precipitate is normally about 2 to 5 (and may range as high as 10:1). After the cake has been washed (repulped) with water or acidified water (pH about 2.5), the Ni/Co ratio is improved and normally averages about 0.5 to 1.5. The precipitate is then further processed to reclaim the contained nickel values therein and to obtain a pure marketable cobalt product.

In order to refine further the cobaltic precipitate, it has to be dissolved or leached which is not easily accomplished. One method which has been proposed is that disclosed in U.S. Pat. No. 3,933,975. According to this patent, the cobalt black is leached with strong ammonia-ammonium sulfate solution at elevated temperatures of 180° F. to 300° F. (82° C. to 149° C.). While the method is commercially acceptable, a drawback is that the leach residue presents a considerable filtration problem. Moreover, the dissolution tends to be incomplete. A complete dissolution is a highly desirable goal because of the high market value for cobalt.

Substantially complete dissolution can be achieved by employing sulfuric acid in the presence of $SO_2$ gas. However, the cobalt metal produced from the $H_2SO_4$—$SO_2$ leach product usually contains intolerably high sulfur ranging from about 0.4% to 1% S, generally in the form of cobalt sulfide.

Sulfuric acid dissolution in the presence of metallic reductants (e.g. Co, Ni, Fe, Zn) instead of $SO_2$ has been proposed but this process has not been very desirable because of the introduction of foreign ions (e.g. Fe, Zn) into the processing streams. The use of metallic nickel or cobalt as a reductant, while compatible with the process, adds to the production cost.

The invention overcomes the aforementioned disadvantage in that substantially complete dissolution can be attained; the dissolution residue can be easily filtered; the method of the invention is more economical than the system $H_2SO_4$—$SO_2$ and also a low sulfur cobalt metal is obtainable.

OBJECTS OF THE INVENTION

It is the object of the present invention to provide an improved method for the dissolution of precipitates comprising cobalt in the cobaltic state.

Another object is to provide a method for the recovery of cobalt from precipitates containing cobalt in the cobaltic state using an organic reductant to reduce the cobalt in the precipitate from the cobaltic to the cobaltous state.

These and other objects will more clearly appear when taken in conjunction with the following disclosure and the appended claims.

STATEMENT OF THE INVENTION

The invention is directed to the recovery of cobalt from cobalt-containing nickel solutions wherein the cobalt is precipitated from said solution as a cobaltic hydroxide-containing precipitate which may also contain some nickel. The invention resides in an improved method of dissolving the precipitate for the subsequent recovery of cobalt therefrom, the method comprising forming an aqueous slurry of the precipitate acidified with sulfuric acid to a pH ranging from about 0.1 to 2, adding to the aqueous slurry an amount of organic reductant, for example, an organic reductant selected from the group consisting of alcohols, aldehydes, ketones and organic acids, including their derivatives and salts, sufficient to effect substantial reduction of the precipitate to the soluble state, and continuing said reduction at a temperature ranging up to about the boiling point to effect dissolution of said precipitate.

Any organic compound can be employed as the reductant which can be oxidized to a higher oxidation state by an oxidant (e.g. cobaltic ion) at a voltage of 1.4 to 1.8 referred to the standard hydrogen electrode. The organic reductant should preferably be at least partially soluble in aqueous solutions.

As stated earlier, the cobalt hydroxide precipitate is generally obtained as an intermediate product containing nickel in the process of separating cobalt from nickel sulfate leach solution. The nickel solutions usually contain relatively high amounts of nickel, e.g. 50 to 100 gpl (grams per liter) nickel, and relatively low concentrations of cobalt, for example, 0.5 to 5 gpl cobalt. In carrying out the cobalt precipitation process, a portion of the cobalt-containing nickel stream obtained during leaching is diverted to the preparation of nickelic hydroxide which is subsequently combined with the main nickel stream to effect removal of cobalt therefrom as a cobaltic hydroxide-containing precipitate.

The nickelic hydroxide precipitate is first produced by precipitating nickelous hydroxide [$Ni(OH)_2$] which is thereafter oxidized into a high valency nickel compound containing both $Ni^{3+}$ and $Ni^{4+}$ known as nickelic hydroxide or "nickel black" which is commonly represented by the formula $NiOOH$ or $Ni(OH)_3$. One method of oxidizing the nickelous precipitate [$Ni(OH)_2 \rightarrow NiOOH$] is to employ an electrolytic process in which the precipitate is oxidized at the anode in a galvanic cell. Another method is to use strong oxidizing agents, such as chlorine gas, ozone, sodium hypochlorite or a mixture of $O_2 + SO_2$. The foregoing methods of oxidation are disclosed in U.S. Pat. No. 3,933,976 which is incorporated herein by reference.

The nickelic hydroxide obtained by any one of the foregoing or other methods is very effective in removing the cobaltous ion from nickel solutions in accordance with the following reactions:

$$NiOOH + Co^{2+} \rightarrow CoOOH + Ni^{2+}$$

$$Ni(OH)_3 + Co^{2+} + 2H_2O \rightarrow Co(OH)_3 + Ni(OH)_2 + 2H^+$$

The product of the foregoing reactions is a high valency cobalt compound known either as cobaltic hydroxide or "cobalt black". This method generally reduces or depletes the cobalt content of the nickel solution from a level, for example, of 0.5 to 5 gpl Co down to 0.05 gpl or less, e.g. to approximately 0.01 gpl Co.

However, the cobalt black precipitate carries with it a significant amount of nickel, such as occluded nickel solution, unreacted nickel black or the simple nickelous hydroxide generated during the cobalt separation process.

Since cobalt black and nickel black pose difficult filtration problems, a filter aid is generally employed dispersed in the slurry. A typical filter aid is one referred to by the trademark "Perlite" which is a fused sodium-potassium aluminum silicate. Another example of a filter aid is one identified by the trademark "Celite" or "Diatomite", the filter aid being a siliceous mineral comprised of skeletons of microscopic plants, otherwise referred to as infusorial earth. A still another filter aid is one known in the trade as "Solca-Floc" comprising particulate cellulose material.

DETAILS OF THE INVENTION

As stated hereinbefore, in order to achieve economically substantially complete dissolution of the precipitate, an organic reductant capable of at least partial solubility in aqueous solutions is employed, preferably selected from the group consisting of alcohols, aldehydes, ketones and organic acids and derivatives or salts thereof. From the standpoint of their effectiveness, solubility, cost, availability and handling, the more preferred compounds are methyl and ethyl alcohol, formaldehyde, acetone and formic acid, with methyl alcohol and formaldehyde the most attractive.

In carrying the invention into practice, an aqueous slurry is produced from the cobalt cake, the solution being acidified with $H_2SO_4$ to a pH ranging from about 0.1 to 2, for example, preferably in the range of about 0.3 to 0.6. The temperature may vary from about ambient to the boiling point with the preferred temperature ranging from about 35° C. to 45° C. At lower temperatures, the dissolution rate tends to decrease while, at temperatures above 60° C., there is a tendency to lose the more volatile organic compounds.

It is preferred that the required amount of organic reductant be added at once; however, the total addition may be proportioned throughout the dissolution process. Depending upon the amount of cobaltic cake to be dissolved, the temperature employed, the organic compound added, and the degree of agitation, the dissolution may take as little as about a few minutes and generally no longer than about 3 to 4 hours. In most cases, the dissolution will take from about 1 to 2 hours.

During dissolution, the pH of the aqueous slurry will tend to increase. It is important, therefore, that a pH of about 0.5 to 1.0 be maintained throughout the dissolution process by the addition of fresh acid, especially if all the acid required to react stoichiometrically with nickel and cobalt hydroxides in the cobalt black was not added in the beginning of the process. Generally, the addition of all of the required acid at the beginning of the process will provide a pH in the region of about 0.5. If the pH is too low, corrosion may be a problem depending on the kind of dissolution equipment employed.

During the dissolution process, the organic reductant employed is oxidized to $CO_2$ and water by the highly oxidized cobalt and nickel hydroxides. The reduction reaction as applied to cobaltic hydroxide, using methyl alcohol as the reductant, is set forth as follows:

$$2\ CoOOH + CH_3OH + 4H^+ \longrightarrow 2\ Co^{2+} + HCHO + 4H_2O \quad (1)$$

$$2\ CoOOH + HCHO + 4H^+ \longrightarrow 2\ Co^{2+} + HCOOH + 3H_2O \quad (2)$$

$$2\ CoOOH + HCOOH + 4H^+ \longrightarrow 2\ Co^{2+} + CO_2 + 4\ H_2O \quad (3)$$

As will be clearly apparent from equation (1), methyl alcohol reacts with the precipitate to reduce cobaltic to cobaltous with the formation of an additional reductant, formaldehyde (HCHO). Referring to equation (2), the formaldehyde reacts with further cobaltic precipitate to reduce cobaltic to cobaltous with the formation of formic acid (HCOOH) which reacts as shown in equation (3) with additional cobaltic precipitate to form $CO_2$.

Thus, each mole of alcohol will theoretically reduce six moles of trivalent metal in the precipitate (what is said for cobaltic hydroxide also applies for any nickelic hydroxide in the cobalt black precipitate). Four or two moles of trivalent metal will be reduced using initially aldehydes or aliphatic acids, respectively.

An advantage of using methyl alcohol is its low molecular weight and the fact that it is an economically attractive reagent. Theoretically, only about 0.1 lb. of methyl alcohol is required to dissolve one pound of $Ni^{3+}$ or $Co^{3+}$ in the cobalt black. However, in practice, consumption of methyl alcohol is somewhat higher, generally about 0.15 to 0.2 lb/lb of Ni+Co. Even then, the economics of the process are quite favorable (one mole of methyl alcohol for 6 moles of trivalent metal). While higher molecular weight partially or substantially water-soluble alcohols, aldehydes, ketones, organic acids and other organics may be employed, the economics are not as favorable compared to methyl alcohol. Thus, methyl alcohol, formaldehyde, formic acid and acetic acid are preferred.

The use of organic compounds in a field involving inorganic chemistry raises the question of organic residuals in the process solution and the effect of the residuals on subsequent processing steps. It has been found that, by using lower molecular weight organic reductants (e.g. methyl alcohol and formaldehyde, in particular) and by exercizing normal control in their use, the residual concentration can be maintained at very low levels, such as below 50 ppm and normally below 20 ppm. Even with higher residual organics, substantially little adverse effects have been noted on the reclaiming of nickel or in producing a marketable cobalt product generally in the metallic state.

If it is desired to control residual organics at even lower levels, one method is to use just enough organic reductant to accomplish a major portion of the dissolution (say 80% to 95% by weight) and then complete the dissolution by using metallic nickel and/or cobalt as the reductant, these metals being compatible with the process solutions being treated.

Thus, after about 90% by weight of the cobalt black precipitate has been dissolved, the reduction and hence the dissolution are completed by adding about 0.5 lb. of metallic nickel and/or cobalt for each pound of undissolved trivalent metal precipitate according to the following equation:

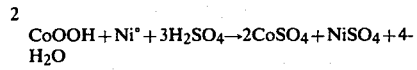
(4)

The process conditions for the above reaction are similar to those employed in using organics as the reductant, that is, maintaining the pH at about 1 at a working temperature of up to the boiling point with adequate agitation.

As illustrative of the various embodiments of the invention, the following examples are given:

EXAMPLE 1

Several of the preferred organic reductants were employed in an evaluation test to effect substantially complete dissolution of a sample of cobalt black. In this comparison series, a 500 gr. sample of wet cobalt black precipitate containing some filter aid and assaying by weight 47.3% moisture, 8.8% Ni, 7.3% Co and containing 7.3% of trivalent metal ($Me^{3+}$) was slurried with 850 ml of water. Sulfuric acid was then added to the slurry to provide a molar ratio of $H_2SO_4$/total Ni+Co in the cobalt black sample of about 1 with the initial pH of the slurry at about 0.5. The slurry was heated to a preferred temperature range of about 55° C. to 60° C. before adding the organic reductant to the reaction vessel. The slurry was then gently agitated in an open beaker until a complete dissolution of the cobalt sample or cake was achieved. This was observed visually by noting a sharp change in color from black to pink-white, or the end point was determined by an iodometric titration of the remaining trivalent nickel ($Ni^{3+}$) or cobalt ($Co^{3+}$).

The effectiveness of the dissolution reaction together with pertinent data will be clearly apparent from the summary in the following table.

| Organic Compound | | Dissolution Conditions | | | Dissolution, % | |
|---|---|---|---|---|---|---|
| Name and Formula | Consumption lbs/lb $Me^{3+}$ | Temp °C. | Time Min | Term. pH | Nickel | Cobalt |
| Methyl Alcohol $CH_3OH$ | 0.18 | 60 | 100 | 1.0 | 99.2 | 99.0 |
| Ethyl Alcohol $CH_3CH_2OH$ | 0.25 | 55 | 180 | 0.9 | 99.9 | 99.6 |
| Formaldehyde HCHO | 0.14 | 60 | 30 | 0.9 | 99.5 | 98.8 |
| Acetone $CH_3COCH_3$ | 0.31 | 49 | 240 | 1.0 | 99.1 | 98.5 |
| Formic Acid HCOOH | 0.40 | 60 | 120 | 0.9 | 98.9 | 98.7 |

EXAMPLE II

A 250 gr sample of cobalt cake containing some filter aid and assaying 50% moisture, 7.7% Ni, 8.3% Co and 8.4% of trivalent metal ($Me^{3+}$) was slurried in 500 ml of water. The pH of the slurry was adjusted to 0.8 with sulfuric acid. The temperature of the slurry was raised to 60° C. To the slurry, 0.09 lb. of formaldehyde was added per pound of $Me^{3+}$ contained in the test charge. In 60 minutes, about 85% of the cobalt black was dissolved. Then, 0.5 lb. of metal cobalt powder was added per pound of residual $Me^{3+}$ contained in the test slurry, and the dissolution carried out for an additional 60 minutes at the same temperature, in which time a complete dissolution of the cobalt cake was achieved (99% plus of both nickel and cobalt). The final dissolution liquor had a pH of 1.3 and contained less than about 10 ppm residual organics, the concentration of residual organics being about the same as found in the water or the nickel-cobalt solutions from which the cobalt black originated.

EXAMPLE III

The same sample of the cobalt black as in Example II was slurried in 500 ml of water. Sulfuric acid was added to provide a molar ratio of $H_2SO_4$ to the total Ni+Co in the cobalt black of about 1. The temperature of the slurry was raised to 55° C. To the slurry, about 0.15 lb. of methyl alcohol was added per pound of $Me^{+3}$ contained in the test charge. In 60 minutes, about 92% of the cobalt black was dissolved. The 0.5 lb. of metal nickel powder was added per pound of residual $Me^{3+}$ contained in the test slurry and the dissolution was continued for an additional 90 minutes in which a complete dissolution of the cobalt black occurred corresponding to 99% plus of both nickel and cobalt. The final dissolution liquor had a pH of about 1 and a residual organic content of about 15 ppm.

EXAMPLE IV

Satisfactory results were obtained with a variety of other organic reductants on the reduction of cobaltic cake at 150° F. (65° C.), the amount of organic reductant corresponding to 0.3 lbs. of reductant per pound of initial $Me^{3+}$ at a mole ratio of $H_2SO_4$/Ni+Co of about 1.0 (i.e. about a pH of 1). The results are given in the following table.

| Material | Chemical Nomenclature | Solubility in Water at Amb. Temp. Wt. % | Dissolution Retention Time (Min.) | % |
| --- | --- | --- | --- | --- |
| 1-Butanol | 1-Butanol | 7 | 45 | >97 |
| Pyrogallol | 1,2,3 Trihydroxybenzene | 44 | 2 | >97 |
| Oxalic Acid | Ethanedidoic Acid | 13 | 60 | >97 |
| Tartaric Acid (d) | L,2,3 Dihydroxybutane-dioic Acid | 57 | 15 | >97 |
| Citric Acid | 1,2,3 Propanetri-carboxylic Acid | 59 | 10 | >97 |
| Salicylic Acid | 2 Hydroxy Benzoic Acid | 0.2 | 20 | >97 |
| Potassium Phthalate | $KHC_8H_4O_4$ | 10 | 2 | >97 |
| Saccharose (cane, beet sugar) | β-D fructofuranoside α(-D glucopyranoside | 67 | 20 | >97 |
| Acetylene (gas) | Acetylene | — | 360 | 60 |

Examples of alcohols which may be employed are methyl ($CH_3OH$), ethyl ($CH_3.CH_2OH$), n-propyl ($CH_3.CH_2.CH_2OH$), isopropyl ($CH_3.CH(OH).CH_2$), n-primary butyl ($CH_3.CH_2.CH_2.CH_2OH$), n-secondary butyl ($CH_3.CH_2.CH(OH).CH_3$), and the like.

Examples of aldehydes are formaldehyde (HCHO), acetaldehyde ($CH_3CHO$), propionaldehyde ($C_2H_5.CHO$), and butryaldehyde ($C_3H_7CHO$).

Examples of ketones include acetone ($CH_3.CO.CH_3$), butanone ($CH_3.CH_2.CO.CH_3$) and 2-pentanone ($CH_3.CO.CH_2.CH_2.CH_3$).

Examples of organic acids are formic (HCOOH), acetic ($CH_3COOH$), propionic ($C_2H_5COOH$), butyric ($C_3H_7COOH$) and valeric ($C_4H_9COOHO$). Examples of other organic reductants are given in Example IV.

As stated hereinbefore, the preferred reductants are methyl alcohol, ethyl alcohol, formaldehyde, acetone, formic acid and acetic acid.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In the recovery of cobalt from nickel leach solutions wherein the cobalt is separated from said solution as a precipitate containing cobaltic hydroxide, the improved method of dissolving said precipitate for the subsequent recovery of cobalt therefrom which comprises, forming an aqueous slurry of said precipitate acidified with sulfuric acid to a pH ranging up to about 2, adding an amount of organic reductant sufficient to effect reduction of trivalent metal in said precipitate to the soluble divalent state, said organic reductant being one capable of being oxidized to the higher oxidation state by an oxidant at a voltage of 1.4 to 1.8 referred to the standard hydrogen electrode, and continuing said reduction at a pH in the range of about 0.5 to 1 to effect substantial dissolution of said precipitate at a temperature ranging up to the boiling point of said aqueous slurry.

2. In the recovery of cobalt from cobalt-containing nickel solutions, wherein the cobalt is separated from said solution as a precipitate containing cobaltic hydroxide and also containing nickel, the improved method of dissolving said precipitate for the subsequent recovery of cobalt therefrom which comprises, forming an aqueous slurry of said precipitate acidified with sulfuric acid to a pH ranging from about 0.1 to 2, adding an amount of an organic reductant selected from the group consisting of alcohols, aldehydes, ketones and organic acids sufficient to effect reduction of trivalent metal in said precipitate to the soluble divalent state, said organic reductant being one capable of being oxidized to the higher oxidation state by an oxidant at a voltage of 1.4 to 1.8 referred to the standard hydrogen electrode, and continuing said reduction at a pH ranging from about 0.5 to 1 to effect dissolution of said precipitate at a temperature ranging from about ambient to boiling point of said aqueous slurry.

3. The method of claim 2, wherein the pH of the aqueous slurry ranges from about 0.3 to 0.6.

4. The method of claim 3, wherein the temperature ranges from about 35° C. to 45° C.

5. The method of claim 2, wherein the organic reductant is selected from the group consisting of methyl and ethyl alcohol, formaldehyde, acetone, formic acid and acetic acid.

6. In the recovery of cobalt from cobalt-containing nickel leach solution, wherein the cobalt is separated from said solution as a precipitate containing cobaltic hydroxide and also containing nickel, the improved method of dissolving said precipitate for the subsequent recovery of cobalt therefrom which comprises, forming an aqueous slurry of said precipitate acidified with sulfuric acid to a pH ranging from about 0.1 to 2, adding an amount of organic reductant selected from the group consisting of methyl and ethyl alcohol, formaldehyde, acetone, formic acid and acetic acid sufficient to effect reduction of trivalent metal in said precipitate to the soluble divalent state, and continuing said reduction at a pH ranging from about 0.5 to 1 to effect dissolution of said precipitate at a temperature ranging up to about the boiling point of said aqueous slurry.

7. The method of claim 6, wherein the pH of the aqueous slurry ranges from about 0.3 to 0.6.

8. The method of claim 7, wherein the temperature ranges from about 35° C. to 45° C.

9. In the recovery of cobalt from cobalt-containing nickel solutions wherein the cobalt is separated from said solution as a precipitate containing cobaltic hydroxide and also containing nickel, the improved method of dissolving said precipitate for the subsequent recovery of cobalt therefrom which comprises, forming an aqueous slurry of said precipitate acidified with sulfuric acid to a pH ranging from about 0.1 to 2, adding an amount of an organic reductant selected from the group consisting of alcohols, aldehydes, ketones and organic acids sufficient to effect about 70% to 95% reduction of trivalent metal in said precipitate to the soluble divalent state, said organic reductant being one capable of being oxidized to the higher oxidation state by an oxidant at a voltage of 1.4 to 1.8 referred to the standard hydrogen electrode, continuing said reduction to effect dissolution of said precipitate at a temperature ranging from about ambient to the boiling point of said aqueous slurry while consuming substantially all of said organic reductant, and then completing said reduction and dissolution of said precipitate by adding an amount of a metal powder selected from the group consisting of nickel and cobalt sufficient to reduce the remainder of the contained trivalent metal to the divalent state.

10. The method of claim 9, wherein the pH of the aqueous slurry ranges from about 0.3 to 0.6.

11. The method of claim 10, wherein the temperature ranges from about 35° C. to 45° C.

12. The method of claim 9, wherein the organic reductant is selected from the group consisting of methyl and ethyl alcohol, formaldehyde, acetone, formic acid and acetic acid.

13. In the recovery of cobalt from cobalt-containing nickel solutions wherein the cobalt is separated from said solution as a precipitate containing cobaltic hydroxide and also containing nickel, the improved method of dissolving said precipitate for the subsequent recovery of cobalt therefrom which comprises, forming an aqueous slurry of said precipitate acidified with sulfuric acid to a pH ranging from about 0.1 to 2, adding an amount of organic reductant sufficient to effect reduction of trivalent metal in said precipitate to the soluble divalent state, said organic reductant being one capable of being oxidized to the higher oxidation state by an oxidant at a voltage of 1.4 to 1.8 referred to the standard hydrogen electrode, continuing said reduction to effect dissolution of said precipitate at a temperature ranging from about ambient to the boiling point of said aqueous slurry while consuming substantially all of said organic reductant, and then completing said reduction and dissolution of said precipitate by adding an amount of a metal powder selected from the group consisting of nickel and cobalt sufficient to reduce the remainder of the contained trivalent metal to the divalent state.

* * * * *